No. 769,583.

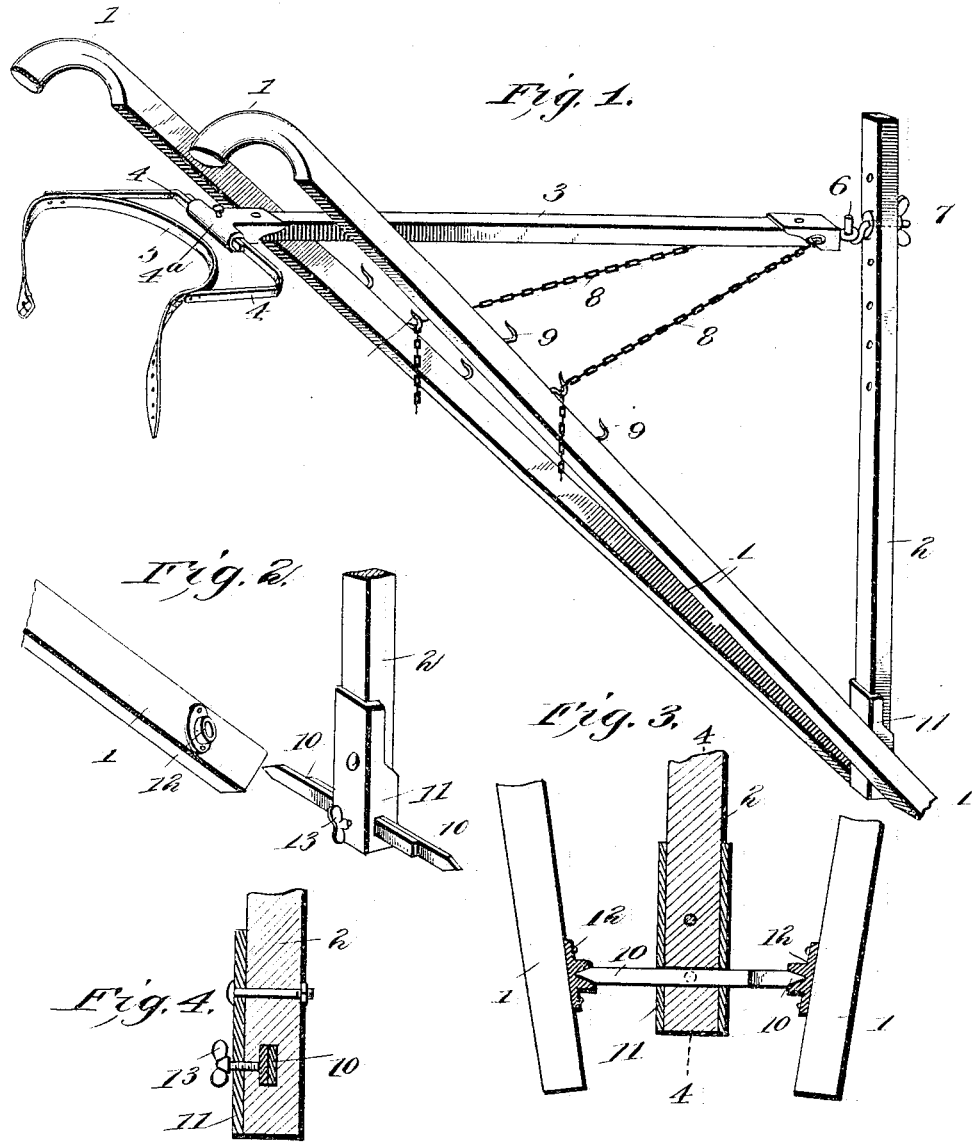

Patented September 6, 1904.

UNITED STATES PATENT OFFICE.

LEONIDAS W. AVANT, OF ATASCOSA, TEXAS.

HAND-PLOW PROPELLER.

SPECIFICATION forming part of Letters Patent No. 769,583, dated September 6, 1904.

Application filed February 17, 1904. Serial No. 193,995. (No model.)

*To all whom it may concern:*

Be it known that I, LEONIDAS W. AVANT, a citizen of the United States, and a resident of Atascosa, in the county of Bexar and State of Texas, have invented certain new and useful Improvements in Hand-Plow Propellers, of which the following is a specification.

My invention relates to an improvement in that class of hand-plow propellers in which the propelling force is exerted by the plowman or operator by means of a device connecting the plow with the body of the operator.

One of the chief objects of my invention is to enable the point at which the propelling force is exerted to be shifted vertically in order that the plow attachment may be adjusted to accommodate operators or plowmen of different heights; secondly, the attachment is so constructed that the force applied by the operator may be varied in its relation to the plow as conditions require; thirdly, the invention includes improved means for applying the attachment to the plow-handles, which are separated more or less from each other.

The details of construction, arrangement, and operation of parts are as hereinafter described and illustrated in the accompanying drawings, in which—

Figure 1 is a perspective view illustrating my invention in connection with the plow-handles. Fig. 2 is a perspective view illustrating the means for connecting the attachment proper with the lower portion of the handles. Fig. 3 is a partly-sectional view further illustrating the portion of the attachment shown in Fig. 2. Fig. 4 is a sectional view on the line 4 4 of Fig. 3.

In the drawings, 1 indicates the handles of a plow which is adapted to be propelled by the operator or plowman, the said handles being attached to the plow proper in the usual way.

My improved attachment is constructed, attached, and operated as follows:

The vertical bar 2 is connected with the lower portions of the handles 1 and provided with a series of transverse holes, as shown. A horizontal bar 3 is detachably and adjustably connected with the vertical bar 2. This bar 3 projects rearward between the handles 1 and is provided at its outer end with a fork composed of semicircular bars 4, to whose outer ends a body-belt 5 is riveted. The inner ends of the bars 4 are straight and lap past each other in the casting $4^a$, secured to the bar 3. A clamp-screw serves to hold the bars in any required adjustment. The forward end of the propelling-bar 3 is provided with an eye which receives the hook 6, having a shank adapted to pass through the holes in the vertical bar 2. A wing-nut 7 is applied to the threaded shank of the hook, as shown. The bar 3 is connected by chains 8 with the handles 1. The said chains are attached to a casting secured to the bar 3 at its pivotal end and are detachably connected with the handles 1 by means of hooks 9, fixed in the latter and arranged at short distances from each other. It is apparent that by the construction and arrangement of parts described the propelling-bar 3 may be adjusted higher or lower on the vertical bar 2 and that the chains 8 may be attached to the handles at higher or lower points. The vertical adjustment of the propelling-bar 3 adapts it to operators or plowmen of different heights, so that the propelling-bar may be always maintained practically horizontal, and thus the propelling force be applied at an angle of ninety degrees to the body of the operator. Further, the shifting of the points of attachment of the chains 8 higher or lower on the handles 1 has the effect of varying the application of force for propelling the plow, since the handles are rigidly attached to the latter, and thus practically constitutes levers to which the propelling force is applied, as well as guides by which the plow is directed and otherwise manipulated. It will be seen that the arrangement is such that the propelling force or leverage is practically applied to the handles or levers 1 at the points 9 irrespective of the height of the adjustment of screw-hook 6 of the vertical bar 2. Further, the operator or plowman may apply greater force with less exertion and fatigue through the medium of the body-brace than is practicable in the case of hand-plows provided with handles alone.

The means for detachably connecting the lower portion of the bar 2 with the handles 1, as illustrated in Figs. 2, 3, 4, consist of two parallel bars 10, which are laid side by side and adapted to slide in a transverse opening in the casing 11, which forms the foot or terminal of the bar 2. The conical or pointed ends of the bars 10 enter conical sockets in metal castings 12, which are suitably secured to the inner sides of the handles, as shown. A clamping-screw 13, having a winged head, is applied for securing the lapping bars 10, duly adjusted according to the spaces between the handles. It will be seen that by this means I provide for a rocking attachment of the vertical bar 2 to the handles 1 and that the attachment may be applied whatever be the distance between the handles.

It will be seen that the attachment may be readily applied to or removed from the plow or plow-handles as occasion requires and that it may be easily adjusted for the purposes hereinbefore stated.

What I claim is—

1. In a hand-plow propeller, the combination, with the handles and the vertical bar connected therewith, of a propelling-bar having means for attachment to the body of the operator and the vertically-adjustable connection between the said bars, whereby the propelling-bar may be placed at different heights for the purpose specified, and means for connecting the propelling-bar with the handles substantially as described.

2. In a hand-plow propeller, the combination, with the handles and the vertical bar connecting with the lower portions of the same, of a propelling-bar arranged horizontally and provided with a body-belt secured at its outer end, a clamp which connects the two bars and is adjustable vertically on the vertical bar, a chain connecting the propelling-bar with the handles, substantially as described.

3. In a hand-plow, the combination, with the handles, and the vertical bar connecting the lower portions of the same, of a propelling-bar arranged horizontally, and provided at its free end with a body-belt for attachment to the operator, the hook which connects the two bars and is adjustable on the vertical bar, means for clamping it in any adjustment, chains connecting the propelling-bar with the handles, and devices on the latter which are arranged at different heights to provide for shifting the point of attachment of the chains, substantially as described.

4. In a hand-plow, the combination, with the handles and the vertical bar attached thereto, of a propelling-bar arranged horizontally and provided with means for attachment to the body of the operator, the means for connecting it with the vertical bar, chains which extend from the forward end of the propelling-bar to the handles, the hooks arranged on the latter for attachment of the chains, substantially as described.

5. In a hand-plow, the combination, with the handles of a vertical bar, and horizontal propelling-bar connected therewith, and means for connecting it also with the handles, of lapping bars passing through the lower portion of the vertical bar and seated in bearings attached to the handles, the means for clamping the lapping bars in any adjustment, substantially as described.

6. In a hand-plow, the combination, with the handles of a vertical bar and horizontal bar, of the means for detachably connecting the vertical bar with the handles, which means are adapted for lateral extension, and a device for securing them in position when extended, substantially as described.

7. In a hand-plow, the combination with the handles and a push-bar, connected thereto, and having a socket at its rear end, of bent bars held adjustably in said socket, and a device connecting the ends of said bars, which is adapted for contact with the body of the plowman, as described.

LEONIDAS W. AVANT.

Witnesses:
   Jos. Umscheid,
   J. H. Patterson.